United States Patent [19]

Pratt

[11] 3,807,356
[45] Apr. 30, 1974

[54] AQUARIUM TABLE
[76] Inventor: Allan D. Pratt, 111 N. Bridgeton Rd., Portland, Oreg. 97217
[22] Filed: Mar. 9, 1973
[21] Appl. No.: 339,506

[52] U.S. Cl. .................................. 119/5, 240/4
[51] Int. Cl. .......................................... A01k 64/00
[58] Field of Search .................. 119/3, 5; 240/4, 4.1

[56] References Cited
UNITED STATES PATENTS

| 3,185,829 | 5/1965 | Rav | 119/5 X |
| 3,150,636 | 9/1964 | Formost | 119/5 |
| 2,133,740 | 10/1938 | Donohoue | 119/5 |

*Primary Examiner*—Robert Peshock
*Assistant Examiner*—J. N. Eskovitz
*Attorney, Agent, or Firm*—Oliver D. Olson

[57] ABSTRACT

The peripheral rim of a hollow shell supports the peripheral rim of a water container disposed within and spaced from the inner surface of the shell, and the peripheral support rim of a table top cover is supported on the peripheral rim of the container. The water container preferably is of transparent, or other light-transmissible material, and lights are mounted within the space between the container and shell. The assembly is arranged to allow water to be filled into the container in contact with a major area of the underside of the cover, leaving a minor area thereof disposed above the water level to provide an air pocket therebetween. An opening through the cover registers with said minor area for introducing fish food and for the circulation of air.

10 Claims, 3 Drawing Figures

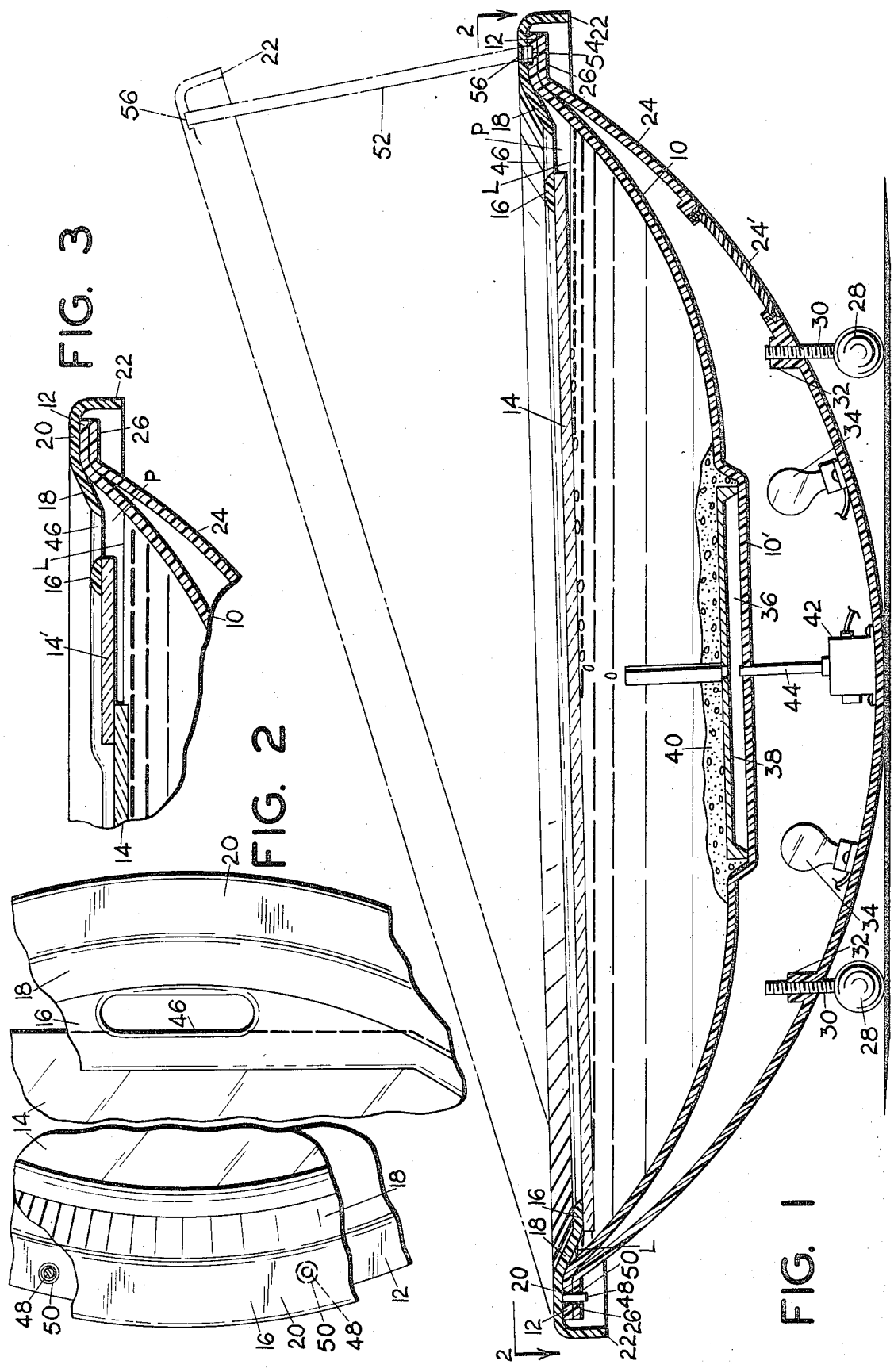

AQUARIUM TABLE

BACKGROUND OF THE INVENTION

This invention relates to aquarium tables, and more particularly to a novel aquarium table construction which affords maximum visibility of the contents of the aquarium and facilitates the feeding of fish in the aquarium.

Aquarium tables provided heretofore are characterized generally by the inability to prevent the development of air bubbles randomly across the under surface of the transparent top. Such air bubbles concentrate particles of dirt and other debris and otherwise tend to obscure the view of fish and other objects within the aquarium. They also create an unattractive appearance. Additionally, the constructions of such aquarium tables render it difficult to administer food to the fish.

SUMMARY OF THE INVENTION

In its basic concept, the aquarium table of this invention includes a transparent cover supported on a water container in such manner that water in the container contacts a major area of the underside of the cover, leaving a minor area thereof disposed above the water level to form an air pocket therebetween, an opening being provided in the cover registering with said minor area for the introduction of fish food and for the circulation of air.

It is by virtue of the foregoing basic concept that the principal objective of this invention is achieved; namely, to overcome the aforementioned disadvantages of prior aquarium tables.

Another object of this invention is the provision of an aquarium table which is of simplified construction for economical manufacture, which serves the utilitarian purpose of a table while providing an attractive display of fish and other objects within the aquarium, and which is capable of being cleaned and otherwise maintained with maximum facility.

The foregoing and other objects and advantages of this invention will appear from the following detailed description, taken in connection with the accompanying drawing of preferred embodiments.

BRIEF DESCRIPTION OF THE DRAWING

FIG. 1 is a view in transverse vertical section of an aquarium table embodying the features of this invention, the cover component thereof being shown in open position in broken lines.

FIG. 2 is a fragmentary, foreshortened plan view as viewed in the direction of the arrows 2—2 in FIG. 1.

FIG. 3 is a fragmentary transverse sectional view showing a modified construction of the table top cover component.

DESCRIPTION OF THE PREFERRED EMBODIMENTS

The aquarium table of this invention includes a water container 10 open at its top end and adapted to contain water to a predetermined level L. In the embodiment illustrated, the container is in the form of a large bowl provided with an outwardly extending peripheral rim 12.

The open top of the container is closed removably by means of a cover which serves as a table top. The central portion 14 of the cover is of transparent material, such as glass or clear synthetic plastic, so as to expose to view the contents of the container.

The peripheral portion of the cover is bonded to the central portion, by means of well known adhesives or other suitable bonding agents, to provide a liquid-tight seal therebetween. The peripheral portion preferably is made of synthetic plastic, but it may be made of metal, ceramic, or other suitable material. The peripheral portion includes an inner section 16 which is bonded to the center portion 14 of the cover, an intermediate section 18 which extends angularly outward and upward from the inner section, and an outer rim section 20 which extends in a plane substantially parallel to but elevated above the plane of the inner section 16. The rim section is dimensioned to rest upon the peripheral rim 12 of the container. As illustrated, the outer extremity of the rim section 20 may be turned downward to provide a peripheral skirt 22 for the table. This skirt also functions as a structural reinforcement for the peripheral portion of the cover.

In the preferred emboidment illustrated, the container is supported within a hollow shell 24, in spaced relation to the inner surface thereof. For this purpose the shell is provided with an outwardly projecting peripheral rim 26 which underlies and supports the peripheral rim 12 of the container.

In the embodiment illustrated, the hollow shell is in the shape of a spherical segment. Accordingly, means is provided for supporting the shell in a stable condition upon a floor. The supporting means illustrated comprises a plurality of caster wheels 28, each of which is mounted on one end of a threaded shaft 30. The shaft extends upward through a threaded opening in the shell and an integral, reinforcing boss 32. In this manner the caster wheels may be adjusted vertically relative to the shell, for purposes explained more fully hereinafter.

With the provision of the supporting shell 24, the container 10 may advantageously be made of light-transmissible material, preferably clear or translucent synthetic plastic. One or more electric lamps 34 thus may be mounted within the space within the shell and the container, preferably on the inner side of the shell, to provide illumination of the contents of the aquarium.

In the embodiment illustrated, the central portion 10' of the container 10 is depressed to form a pocket 36 in which to support a filter 38 over which is distributed a quantity of gravel 40. An electrically driven air pump 42 in the shell has an outlet air tube 44 extending upward therefrom through an opening in the container and terminating at its upper end below the filter. Suitable sealing means is provided between the tube and container, as will be understood.

It is to be noted in FIG. 1 that the electric lamps 34 are disposed under the center portion 10' of the container in which the filter and gravel are disposed. Since this central portion thus is rendered opaque, the lamps are not directly visible to the viewer. However, the light emanating from the lamps is visible indirectly through the light-transmissible portion of the container surrounding the central opaque portion. This arrangement provides very pleasing effects to the viewer.

A removable section 24' of the shell serves to provide an opening through which to gain access to the interior, for servicing the electric lamps and air pump.

It is an important feature of this invention that the central, transparent portion 14 of the cover be supported in such position that a major portion of the area of its underside be disposed below the aforementioned predetermined level L of water in the container, with the remaining minor portion of said area being disposed above said predetermined water level. In this manner said major portion remains in contact with water, whereby to insure maximum visibility of the contents of the aquarium. With the remaining minor portion of the area of the underside of the cover being disposed above said predetermined water level, an air pocket P is formed therebetween. This air pocket serves the dual function of concentrating a supply of air for fish in the aquarium, and also of concentrating food for the fish.

For these purposes an opening 46 is provided through the cover, preferably through the inner section 16 of the peripheral portion thereof, in registry with said air pocket. Thus, fish food may be dropped through said opening onto the water underlying the air pocket. It has been found that such food tends to remain in the area of the air pocket, rather than to be dispersed throughout the water, thereby contributing to the maintenance of maximum visibility through the major portion of the cover. Additionally, air bubbles rising from the air pump through the filter tend to migrate toward the air pocket and thence through the opening 46 to the atmosphere. This provides the air pocket with a continuous supply of fresh air for the fish, while also maintaining the major area of the cover 14 free of air pockets.

Various means may be utilized to provide the air pocket. In FIG. 1 the caster wheels 28 are adjusted vertically to tilt the table top cover 14 slightly off horizontal, with the side of the cover having the opening 46 therein being slightly above the opposite side. In this manner, the major portion of the area of the undersurface of the transparent center portion 14 of the cover is below the aforementioned predetermined level L of water in the container, while the remaining minor portion of said area is elevated above said water level.

It is to be noted from FIG. 1 that the inclined arrangement of the center portion of the top enhances the lateral movement of air bubbles from the pump to the air pocket P and thence outward through the opening 46 to the atmosphere. This contributes advantageously to the rapid elimination of air pockets under the cover 14 and hence to maximum visibility of the contents of the aquarium. Moreover, this migration of air bubbles creates an interesting and pleasing appearance to the observer.

In FIG. 3, the air pocket P is provided by forming a minor portion of the transparent center portion 14 of the cover as a separate piece 14' and bonding it to the upper surface of the major portion as an extension thereof. In this manner the under surface of the minor section 14' is elevated above the under surface of the major section, by the thickness of the latter. Accordingly, the cover may be disposed horizontally, with the under surface of the major section being located below the predetermined level L of water in the container. The space between the water level and the under surface of the minor section thus forms the desired air pocket P. In this instance it may be desirable to locate the air outlet tube as close as practicable vertically below the air pocket, to minimize the distribution of air bubbles under the cover.

It will be apparent that various other means may be employed to form the air pocket. For example, a minor portion of the under surface of the transparent center portion 14 may be elevated from the remaining portion by reducing the thickness in said minor area from the underside thereof, to provide the same effect as is illustrated in FIG. 3.

Means preferably is provided for elevating the table top cover to an open position exposing the interior of the container 10 for cleaning and other maintenance of the contents of the aquarium. In the embodiment illustrated, a pair of laterally spaced pins 48 project downward from the underside of the rim section 20 of the cover and are received frely in oppositely flared openings 50 through the peripheral rims of the container and shell. This arrangement allows the opposite side of the cover to be elevated to the position illustrated in broken lines in FIG. 1. This position of elevation may be supported by means of an elongated support rod 52 the opposite ends of which are received removably in stabilizing sockets 54 and 56 formed, respectively, in the upper surface of the container rim 12 and the lower surface of the rim section 20 of the cover.

From the foregoing it will be appreciated that this invention provides an aquarium table of simplified construction for economical manufacture, which is capable of being maintained with speed and facility, which is attractive in appearance, which provides a concentrated pocket of fresh air for the fish, which facilitates the feeding of fish without removal or other manipulation of any component of the table, and which affords unobstructed vision of the contents of the aquarium through a transparent table top by the elimination of air pockets under the major area of the top.

It will be apparent to those skilled in the art that various changes may be made in the size, shape, type, number and arrangement of parts described hereinbefore without departing from the spirit of this invention.

Having now described my invention and the manner in which it may be used, I claim:

1. An aquarium table comprising:
   a. a water container having an open top and adapted to contain water to a predetermined level, and
   b. a cover including a transparent center portion and a peripheral rim portion offset upwardly from the central portion for support on the upper peripheral edge of the container, whereby to dispose said central portion in a plane below the upper peripheral edge of the container, with a major portion of the area of the underside of said central portion disposed below said predetermined water level,
   c. a minor portion of the area of the underside of the center portion of the cover being disposed above said predetermined water level, whereby to form an air pocket therebetween,
   d. the cover having an opening therethrough registering with said minor area for the introduction of fish food and for the circulation of air.

2. The aquarium table of claim 1 including means for supporting the cover at a slight angle from horizontal, whereby to provide said major and minor area portions relative to said predetermined water level.

3. The aquarium table of claim 1 wherein the cover includes a minor area portion the undersurface of which is offset upwardly from the under surface area of the major area portion thereof.

4. The aquarium table of claim 1 including pivot means interengaging the container and cover for pivoting the cover relative to the container between positions closing the upper end of the container and opening said upper end of the container for access to the interior thereof.

5. The aquarium table of claim 4 wherein the upper edge of the container and rim portion of the cover are provided with sockets, and an elongated rod is receivable at its opposite ends removably in said sockets for supporting the cover in said open position.

6. The aquarium table of claim 1 including a hollow shell supporting the container therein in spaced relation thereto.

7. The aquarium table of claim 6 wherein the shell and container are provided with outwardly projecting upper peripheral rims for mutual engagement for supporting the container within the shell, the peripheral rim of the cover engaging the peripheral rim of the container for support thereby.

8. The aquarium table of claim 6 wherein the container is made of light-transmittable material, and a source of light is contained in the space between the shell and the container.

9. The aquarium table of claim 8 wherein a central portion of the container is rendered substantially opaque, and the source of light is disposed in said space underlying said opaque central portion of the container.

10. The aquarium table of claim 1 wherein:
a. a hollow shell supports the container therein in spaced relation thereto,
b. the shell and container are provided with outwardly projecting upper peripheral rims for mutual engagement for supporting the container within the shell, the peripheral rim of the cover engaging the peripheral rim of the container for support thereby,
c. pivot means interengages the rims of the container and cover for pivoting the cover relative to the container between positions closing the upper end of the container and opening said upper end of the container for access to the interior thereof,
d. the container is made of light-transmissible material, and
e. a source of light is contained in the space between the shell and the container.

* * * * *